US012675851B2

(12) United States Patent
Li

(10) Patent No.: US 12,675,851 B2
(45) Date of Patent: Jul. 7, 2026

(54) IMAGE DISPLAY METHOD AND APPARATUS, AND ELECTRONIC DEVICE

(71) Applicant: VIVO MOBILE COMMUNICATION CO., LTD., Dongguan (CN)

(72) Inventor: Jiayu Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 233 days.

(21) Appl. No.: 18/226,819

(22) Filed: Jul. 27, 2023

(65) Prior Publication Data

US 2023/0368338 A1      Nov. 16, 2023

Related U.S. Application Data

(63) Continuation of application No. PCT/CN2022/073036, filed on Jan. 20, 2022.

(30) Foreign Application Priority Data

Jan. 28, 2021     (CN) ......................... 202110116834.9

(51) Int. Cl.
*G06T 5/70* (2024.01)
(52) U.S. Cl.
CPC ...... *G06T 5/70* (2024.01); *G06T 2207/10016* (2013.01); *G06T 2207/20092* (2013.01)
(58) Field of Classification Search
CPC ............. G06T 5/70; G06T 2207/10016; G06T 2207/20092
See application file for complete search history.

(56) References Cited

U.S. PATENT DOCUMENTS 6,157,396 A * 12/2000 Margulis ................... G06T 1/20
                                                                  345/506
6,381,363 B1 * 4/2002 Murching ............ G06V 10/235
                                                                  382/164
(Continued)

FOREIGN PATENT DOCUMENTS

CN        101266685 A     9/2008
CN        106056534 A     10/2016
(Continued)

OTHER PUBLICATIONS

M. Mahajan and P. Bhanodia, "Image inpainting techniques for removal of object," International Conference on Information Communication and Embedded Systems (ICICES2014), Chennai, India, 2014, pp. 1-4, doi: 10.1109/ICICES.2014.7034008. (Year: 2014).*
(Continued)

*Primary Examiner* — Charles L Beard
(74) *Attorney, Agent, or Firm* — IPX PLLC

(57) ABSTRACT

An image display method and apparatus, and an electronic device are provided. The method includes: receiving a first input from a user when an electronic device is in a target shooting mode; shooting M frame images in response to the first input; and displaying, when a first image among the M frame images includes a target object, a second image in a first display region. The second image is an image after first processing is performed on the first image, the first processing is to remove the target object in the first image based on at least one frame image among the M frame images, the at least one frame image does not include the first image, and M is an integer greater than 1.

9 Claims, 11 Drawing Sheets

(56)  References Cited

U.S. PATENT DOCUMENTS

| | | | | |
|---|---|---|---|---|
| 6,456,340 B1* | 9/2002 | Margulis | H04N 9/3194 | 348/746 |
| 6,681,058 B1* | 1/2004 | Hanna | H04N 19/23 | 382/294 |
| 8,194,993 B1* | 6/2012 | Chen | G06T 5/70 | 382/254 |
| 8,588,551 B2* | 11/2013 | Joshi | G06T 5/50 | 382/294 |
| 8,964,025 B2* | 2/2015 | Cudak | H04N 23/80 | 348/135 |
| 9,235,874 B2* | 1/2016 | Voronov | G06T 5/50 | |
| 9,247,129 B1* | 1/2016 | Gray | H04N 5/272 | |
| 9,407,674 B2* | 8/2016 | Chan | G06F 3/04847 | |
| 9,459,785 B2* | 10/2016 | Kim | H04N 13/361 | |
| 9,478,006 B2* | 10/2016 | Edwin | G06T 3/04 | |
| 9,659,350 B2* | 5/2017 | Kobayashi | G06T 5/77 | |
| 9,736,442 B1* | 8/2017 | Wong | H04N 9/3147 | |
| 9,832,351 B1* | 11/2017 | Schoenblum | G06T 5/70 | |
| 9,916,644 B1* | 3/2018 | Swami | H04N 23/95 | |
| 9,992,516 B2* | 6/2018 | Sato | H04N 19/86 | |
| 10,110,814 B1* | 10/2018 | Day | G06V 20/40 | |
| 10,250,910 B1* | 4/2019 | Linzer | H04N 23/6845 | |
| 10,482,359 B2* | 11/2019 | Kauffmann | G06T 5/77 | |
| 10,748,264 B2* | 8/2020 | Ito | G06V 10/273 | |
| 11,190,689 B1* | 11/2021 | Wang | H04N 23/683 | |
| 11,900,566 B1* | 2/2024 | Ferrés | G06T 5/50 | |
| 12,142,050 B1* | 11/2024 | Abburi | G06Q 40/08 | |
| 12,495,149 B2* | 12/2025 | Nakai | H04N 19/136 | |
| 2001/0005204 A1* | 6/2001 | Matsumoto | G06T 15/10 | 345/418 |
| 2003/0030636 A1* | 2/2003 | Yamaoka | H04N 5/2627 | 348/E5.042 |
| 2004/0264755 A1* | 12/2004 | Sakaida | G06T 7/0012 | 382/128 |
| 2005/0093985 A1* | 5/2005 | Pilu | H04N 23/68 | 348/208.99 |
| 2005/0104971 A1* | 5/2005 | Pilu | H04N 23/6811 | 348/208.99 |
| 2005/0179784 A1* | 8/2005 | Qi | H04N 23/68 | 348/208.1 |
| 2005/0207644 A1* | 9/2005 | Kitagawara | H04N 1/393 | 358/1.9 |
| 2006/0045372 A1* | 3/2006 | Wang | G06T 11/10 | 382/254 |
| 2006/0233253 A1* | 10/2006 | Shi | H04N 19/513 | 375/E7.193 |
| 2006/0257042 A1* | 11/2006 | Ofek | G06T 5/77 | 382/255 |
| 2007/0086675 A1* | 4/2007 | Chinen | G06T 11/00 | 382/284 |
| 2007/0223831 A1* | 9/2007 | Mei | G06T 5/50 | 348/E5.046 |
| 2008/0246759 A1* | 10/2008 | Summers | G06F 3/0304 | 348/E7.083 |
| 2008/0253685 A1* | 10/2008 | Kuranov | G06T 7/33 | 382/284 |
| 2009/0219391 A1* | 9/2009 | McLeish | G06T 7/277 | 348/169 |
| 2009/0220172 A1* | 9/2009 | Wajs | G06T 7/194 | 382/284 |
| 2009/0245684 A1* | 10/2009 | Makii | H04N 5/2621 | 382/276 |
| 2009/0245685 A1* | 10/2009 | Makii | H04N 23/68 | 382/276 |
| 2010/0195935 A1* | 8/2010 | Brosnan | G06F 3/0317 | 382/321 |
| 2010/0259626 A1* | 10/2010 | Savidge | H04N 23/70 | 348/208.4 |
| 2010/0289632 A1* | 11/2010 | Seder | G01S 13/931 | 382/104 |
| 2010/0309377 A1* | 12/2010 | Schoenblum | H04N 19/587 | 348/607 |
| 2010/0309989 A1* | 12/2010 | Schoenblum | G06T 5/70 | 375/240.29 |
| 2010/0309991 A1* | 12/2010 | Schoenblum | H04N 19/80 | 375/E7.193 |
| 2011/0019093 A1* | 1/2011 | Zhong | H04N 5/144 | 348/607 |
| 2011/0103644 A1* | 5/2011 | Garten | G06T 5/50 | 382/103 |
| 2011/0123131 A1* | 5/2011 | Nakagami | H04N 19/42 | 382/260 |
| 2011/0150284 A1* | 6/2011 | Son | G06T 7/215 | 382/103 |
| 2011/0211732 A1* | 9/2011 | Rapaport | G06F 3/1454 | 382/173 |
| 2011/0254976 A1* | 10/2011 | Garten | G06F 3/1454 | 348/E5.037 |
| 2011/0255602 A1* | 10/2011 | Kondo | H04N 19/61 | 375/E7.243 |
| 2011/0273619 A1* | 11/2011 | Kamei | G06T 7/20 | 348/584 |
| 2011/0298984 A1* | 12/2011 | Schoenblum | H04N 19/86 | 348/607 |
| 2011/0298986 A1* | 12/2011 | Schoenblum | H04N 5/145 | 348/E5.062 |
| 2011/0299781 A1* | 12/2011 | Schoenblum | G06F 3/048 | 382/195 |
| 2011/0304687 A1* | 12/2011 | Joshi | H04N 23/698 | 348/36 |
| 2013/0088592 A1* | 4/2013 | Falomkin | G06F 16/74 | 348/143 |
| 2013/0113892 A1* | 5/2013 | Nakamaru | H04N 13/117 | 348/47 |
| 2013/0208129 A1* | 8/2013 | Stenman | G06T 5/77 | 348/207.1 |
| 2013/0251033 A1* | 9/2013 | Han | H04N 19/23 | 375/240.08 |
| 2014/0184858 A1* | 7/2014 | Yu | H04N 23/80 | 348/241 |
| 2014/0320682 A1* | 10/2014 | Kuwabara | G06T 5/73 | 348/208.6 |
| 2014/0341474 A1* | 11/2014 | Dollar | G06T 7/246 | 382/197 |
| 2015/0070596 A1* | 3/2015 | Gadjali | G02B 27/0172 | 349/11 |
| 2015/0097976 A1* | 4/2015 | Nakanishi | H04N 23/683 | 348/208.1 |
| 2015/0277706 A1* | 10/2015 | Chan | H04L 67/025 | 715/719 |
| 2015/0278986 A1* | 10/2015 | Edwin | G06T 3/04 | 345/428 |
| 2015/0319373 A1* | 11/2015 | Shukla | H04N 23/635 | 348/241 |
| 2016/0086379 A1* | 3/2016 | Sadi | G02B 27/0093 | 345/633 |
| 2016/0180559 A1* | 6/2016 | Karpenko | G06T 5/50 | 382/284 |
| 2016/0269709 A1* | 9/2016 | Lin | H04N 13/156 | |
| 2016/0353036 A1* | 12/2016 | Wang | A47L 11/24 | |
| 2017/0064204 A1* | 3/2017 | Sapiro | G06T 5/20 | |
| 2017/0099441 A1* | 4/2017 | Choi | H04N 9/8042 | |
| 2017/0154433 A1* | 6/2017 | Takakura | G06T 7/593 | |
| 2017/0289454 A1* | 10/2017 | Pettersson | H04N 23/687 | |
| 2017/0339348 A1 | 11/2017 | Shimizu et al. | | |
| 2017/0352136 A1* | 12/2017 | Uliyar | G06T 5/73 | |
| 2018/0033120 A1 | 2/2018 | Wang et al. | | |
| 2018/0070023 A1* | 3/2018 | Oh | H04N 5/2625 | |
| 2018/0137892 A1* | 5/2018 | Ding | G11B 27/11 | |
| 2018/0192098 A1* | 7/2018 | Pekkucuksen | H04N 7/0117 | |
| 2018/0332238 A1* | 11/2018 | Song | H04N 13/296 | |
| 2018/0343448 A1* | 11/2018 | Possos | H04N 19/176 | |
| 2018/0350136 A1* | 12/2018 | Rowley | G06T 7/73 | |
| 2019/0058827 A1* | 2/2019 | Park | G11B 27/00 | |
| 2019/0089910 A1* | 3/2019 | Banik | G06T 5/77 | |
| 2019/0104253 A1* | 4/2019 | Kawai | G06T 3/4038 | |
| 2019/0132530 A1* | 5/2019 | Cheaz | G06T 7/0002 | |
| 2019/0303664 A1* | 10/2019 | Hightower | G06T 11/60 | |
| 2019/0362501 A1* | 11/2019 | Makino | G06T 7/215 | |

(56) References Cited

U.S. PATENT DOCUMENTS

| | | | |
|---|---|---|---|
| 2019/0373280 A1* | 12/2019 | Abe | H04N 19/176 |
| 2019/0378318 A1* | 12/2019 | Roache | G06T 13/80 |
| 2020/0084457 A1* | 3/2020 | Abe | H04N 19/109 |
| 2020/0151854 A1* | 5/2020 | Ferrés | G06T 5/50 |
| 2020/0151858 A1* | 5/2020 | Cai | G06T 5/50 |
| 2020/0202615 A1* | 6/2020 | Kwon | G06T 17/00 |
| 2020/0226769 A1* | 7/2020 | Das | G06T 7/254 |
| 2020/0314434 A1* | 10/2020 | Li | H04N 19/167 |
| 2020/0364834 A1* | 11/2020 | Ferrés | G06T 5/60 |
| 2020/0388017 A1* | 12/2020 | Coffman | G06T 7/194 |
| 2021/0082086 A1* | 3/2021 | Bichu | G06T 5/80 |
| 2021/0183077 A1* | 6/2021 | Hong | G06T 7/248 |
| 2021/0241426 A1* | 8/2021 | Kelly | G06T 5/70 |
| 2021/0264622 A1* | 8/2021 | Wu | G06T 7/337 |
| 2021/0306668 A1* | 9/2021 | Tian | H04N 19/119 |
| 2021/0374904 A1* | 12/2021 | Liao | G06T 5/50 |
| 2022/0050974 A1* | 2/2022 | Ogawa | G06F 40/58 |
| 2022/0058777 A1* | 2/2022 | Cohen | G06V 40/10 |
| 2022/0101578 A1* | 3/2022 | Bedi | G06T 11/00 |
| 2022/0122638 A1* | 4/2022 | Hay | G06F 3/005 |
| 2022/0138913 A1* | 5/2022 | Huang | G06V 10/62 |
| | | | 348/241 |
| 2022/0141396 A1* | 5/2022 | Ruan | H04M 3/567 |
| | | | 348/239 |
| 2022/0180639 A1* | 6/2022 | Ono | G06T 7/292 |
| 2022/0232173 A1* | 7/2022 | Li | H04N 5/77 |
| 2022/0277647 A1* | 9/2022 | Guo | G08G 1/0112 |
| 2022/0279127 A1* | 9/2022 | Park | H04N 23/959 |
| 2022/0375109 A1* | 11/2022 | Venkatesan | G06T 5/50 |
| 2023/0089648 A1* | 3/2023 | Peleg | H04N 5/77 |
| | | | 386/285 |
| 2023/0106434 A1* | 4/2023 | Han | G06F 3/04845 |
| | | | 345/156 |
| 2023/0120232 A1* | 4/2023 | Price | G06T 11/00 |
| | | | 345/619 |
| 2023/0131678 A1* | 4/2023 | Fairfield | H04N 25/77 |
| | | | 348/187 |
| 2023/0188831 A1* | 6/2023 | Hyun | G06T 7/11 |
| | | | 348/207.1 |
| 2023/0215018 A1* | 7/2023 | Lee | H04N 5/265 |
| | | | 382/106 |
| 2023/0217109 A1* | 7/2023 | Bryson | H04N 23/6811 |
| | | | 348/208.6 |
| 2023/0274400 A1* | 8/2023 | Huang | G06T 5/77 |
| | | | 348/241 |
| 2023/0353701 A1* | 11/2023 | Shukla | H04N 23/611 |
| 2023/0368338 A1* | 11/2023 | Li | G06T 5/70 |
| 2023/0386185 A1* | 11/2023 | Park | G06V 10/761 |
| 2023/0410464 A1* | 12/2023 | Ono | G06V 10/60 |
| 2024/0013351 A1* | 1/2024 | Liu | H04N 5/2621 |
| 2024/0031519 A1* | 1/2024 | Baughman | H04N 5/2723 |
| 2024/0055125 A1* | 2/2024 | Sinha | A61B 5/721 |
| 2024/0071035 A1* | 2/2024 | Tsogkas | G06V 10/62 |
| 2024/0135509 A1* | 4/2024 | Liu | G06F 3/0482 |
| 2024/0135513 A1* | 4/2024 | Singh | G06T 5/77 |
| 2024/0135613 A1* | 4/2024 | Ding | G06T 11/60 |
| 2024/0169501 A1* | 5/2024 | Liu | G06T 5/77 |
| 2024/0193789 A1* | 6/2024 | Bandwar | G06T 1/20 |
| 2024/0221130 A1* | 7/2024 | Le | G06T 5/50 |
| 2024/0236338 A1* | 7/2024 | Nakai | H04N 19/167 |
| 2024/0273794 A1* | 8/2024 | Zhou | G06T 11/60 |
| 2024/0281931 A1* | 8/2024 | Xiao | H04N 23/667 |
| 2024/0296525 A1* | 9/2024 | Zhu | G06T 5/70 |
| 2024/0312251 A1* | 9/2024 | Jangid | G06V 40/197 |
| 2024/0331247 A1* | 10/2024 | Smith | G06T 13/80 |
| 2024/0334059 A1* | 10/2024 | Cao | H04N 23/71 |
| 2024/0361898 A1* | 10/2024 | Ardaud | G06F 3/04847 |
| 2024/0364856 A1* | 10/2024 | McNamer | G06T 7/593 |
| 2024/0371006 A1* | 11/2024 | Vestad | G06T 7/194 |
| 2024/0394831 A1* | 11/2024 | Agrawal | G06T 3/40 |
| 2024/0404213 A1* | 12/2024 | Mcilree | G06F 3/011 |
| 2025/0008222 A1* | 1/2025 | Couleaud | H04N 23/632 |
| 2025/0022220 A1* | 1/2025 | Moeys | H04N 23/90 |
| 2025/0047806 A1* | 2/2025 | Menini | G06T 5/70 |
| 2025/0080864 A1* | 3/2025 | Qiao | G06T 5/50 |
| 2025/0111488 A1* | 4/2025 | McCall | G06T 5/80 |
| 2025/0111638 A1* | 4/2025 | Atkinson | G06T 11/60 |
| 2025/0111866 A1* | 4/2025 | Ceylan Aksit | G11B 27/031 |
| 2025/0131546 A1* | 4/2025 | Chen | G06T 7/13 |
| 2025/0148787 A1* | 5/2025 | Burke | G06V 20/47 |
| 2025/0150720 A1* | 5/2025 | So | H04N 23/76 |
| 2025/0157177 A1* | 5/2025 | Fukui | G06V 10/26 |
| 2025/0173832 A1* | 5/2025 | Jung | G06T 5/50 |
| 2025/0173958 A1* | 5/2025 | Wang | G06T 9/00 |
| 2025/0292472 A1* | 9/2025 | Fang | G06T 5/77 |
| 2025/0356467 A1* | 11/2025 | Zhang | G06T 5/50 |
| 2026/0004402 A1* | 1/2026 | McIntosh | G06T 5/50 |
| 2026/0017883 A1* | 1/2026 | Solovev | G06T 3/4038 |
| 2026/0080513 A1* | 3/2026 | Chugunov | G06T 5/60 |

FOREIGN PATENT DOCUMENTS

| | | |
|---|---|---|
| CN | 106791393 A | 5/2017 |
| CN | 107333056 A | 11/2017 |
| CN | 107343149 A | 11/2017 |
| CN | 107390990 A | 11/2017 |
| CN | 109035185 A | 12/2018 |
| CN | 109714501 A | 5/2019 |
| CN | 111124231 A | 5/2020 |
| CN | 111247790 A | 6/2020 |
| CN | 113014799 A | 6/2021 |
| KR | 102061867 B1 | 1/2020 |

OTHER PUBLICATIONS

H. Lin, C. Jing, Y. Huang and X. Ding, "A2Net: Adjacent Aggregation Networks for Image Raindrop Removal," in IEEE Access, vol. 8, pp. 60769-60779, 2020, doi: 10.1109/ACCESS.2020.2983087. (Year: 2020).*

S. Lertrattanapanich and N. K. Bose, "High resolution image formation from low resolution frames using Delaunay triangulation," in IEEE Transactions on Image Processing, vol. 11, No. 12, pp. 1427-1441, Dec. 2002, doi: 10.1109/TIP.2002.806234. (Year: 2002).*

International Search Report issued in corresponding International Application No. PCT/CN2022/073036, mailed Apr. 8, 2022, 4 pages.

First Office Action issued in corresponding CN Patent Application No. 202110116834.9, dated Apr. 7, 2022, 7 pages.

Zhang Qi et al, A fast and effective algorithm to track fish school, Journal of Beijing Normal University (Natural Science), 2017, 53(4): 406-411, Aug. 15, 2017, 1 pages.

Ren Jiamin et al, Multi-target Tracking Algorithm Based on Yolov3 and Kalman Filter, Computer Application and Software, vol. 37 No. 5, May 12, 2020, 8 pages.

* cited by examiner

In the case that the electronic device is in a target shooting mode, the electronic device receives a first input from a user ⟋201

The electronic device shoots M frame images in response to the first input ⟋202

In the case that a first image among the M frame images includes a target object, the electronic device displays a second image in a first display region ⟋203

IMAGE DISPLAY METHOD AND APPARATUS, AND ELECTRONIC DEVICE

CROSS-REFERENCE TO RELATED APPLICATION

This application is a continuation of International Application No. PCT/CN2022/073036, filed Jan. 20, 2022, which claims priority to Chinese Patent Application No. 202110116834.9, filed Jan. 28, 2021. The entire contents of each of the above-referenced applications are expressly incorporated herein by reference.

TECHNICAL FIELD

The present disclosure relates to the field of terminal technologies, in particular to an image display method and apparatus, and an electronic device.

BACKGROUND

As shooting technologies advance, customers have put forward higher requirements for the shooting performance of electronic devices. At present, in a motion shooting scenario such as a car-ride shooting scenario, during the process in which a user takes photos of a landscape, some unwanted objects (such as street lamps, electric wire poles, and the like) constantly appear in the shot, and block the landscape that the user needs to capture, thereby making it difficult to capture the image that does not include the unwanted objects. Therefore, in the case that there are unwanted objects in the captured image, the user removes them from the image using an image editing software, to obtain the image that does not include the unwanted objects.

However, in the above process, the image editing software needs to combine a plurality of images taken in the same scenario to create the image that does not include the unwanted objects, resulting in a cumbersome and time-consuming operation process. In addition, it may be impossible to obtain the image that does not include the unwanted objects with a small number of images captured in the same scenario. Therefore, in the motion shooting scenario, the efficiency with which the electronic device captures unobstructed images is low.

SUMMARY

The embodiments of the present disclosure provide an image display method and apparatus, and an electronic device.

According to a first aspect, an embodiment of the present disclosure provides an image display method, including: receiving a first input from a user, in a case that an electronic device is in a target shooting mode; shooting M frame images in response to the first input; and displaying, in a case that a first image among the M frame images includes a target object, a second image in a first display region. The second image is an image after the first image is subjected to first processing, the first processing is to remove the target object in the first image based on at least one frame image among the M frame images, the at least one frame image does not include the first image, and M is an integer greater than 1.

According to a second aspect, an embodiment of the present disclosure provides an image display apparatus, including: a receiving module, a shooting module, and a display module. The receiving module is configured to receive a first input from a user, in a case that an electronic device is in a target shooting mode. The shooting module is configured to shoot M frame images in response to the first input. The display module is configured to, in a case that a first image among the M frame images includes a target object, display a second image in a first display region. The second image is an image after the first image is subjected to first processing, the first processing is to remove the target object in the first image based on at least one frame image among the M frame images, the at least one frame image does not include the first image, and M is an integer greater than 1.

According to a third aspect, an embodiment of the present disclosure provides an electronic device, including a processor, a memory, and a program or instructions stored on the memory and executable on the processor, the program or the instructions, when executed by the processor, implementing the steps of the method according to the first aspect.

According to a fourth aspect, an embodiment of the present disclosure provides a readable storage medium, storing a program or instructions, the program or the instructions, when being executed by a processor, implementing the steps of the method according to the first aspect.

According to a fifth aspect, an embodiment of the present disclosure provides a chip, including a processor and a communication interface, the communication interface being coupled to the processor, and the processor being configured to run a program or instructions, to implement the steps of the method according to the first aspect.

In the embodiments of the present disclosure, in the case of the target shooting mode, the electronic device may shoot M frame images in response to the first input from the user. In the case that the first image among the M frame images includes the target object (that is, the first image includes an unwanted object (namely the target object) blocking the landscape that the user needs to capture), the electronic device performs the first processing on the first image (that is, removes the target object in the first image based on at least one frame image among the M frame images), to obtain the second image, and displays the second image (the image of the landscape that is not blocked by the unwanted object and the user needs to capture) in the first display region of the electronic device. Through this solution, in the case that the electronic device is in the target shooting mode, the user can trigger the electronic device to obtain the second image with no unwanted object by one input, which simplifies the operation steps, thereby improving the efficiency with which the electronic device captures unobstructed images in the motion shooting scenario.

DETAILED DESCRIPTION

Figure 1:
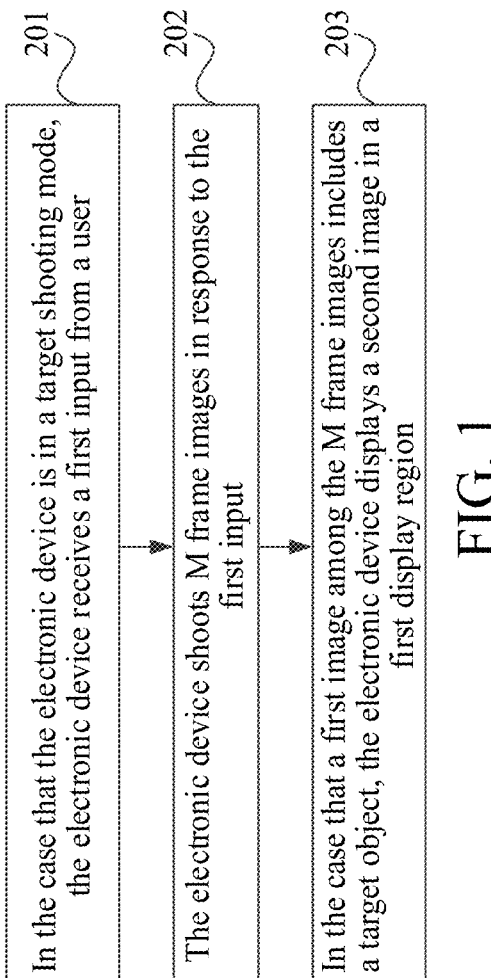
FIG. 1 is a flowchart of an image display method according to an embodiment of the present disclosure.

The technical solutions in embodiments of the present disclosure are described in the following with reference to the accompanying drawings in the embodiments of the present disclosure. Apparently, the described embodiments are merely some rather than all of the embodiments of the present disclosure. All other embodiments obtained by a person of ordinary skill in the art based on the embodiments of this application without making creative efforts shall fall within the protection scope of this application.

The specification and claims of the present disclosure, and terms "first" and "second" are used to distinguish similar objects, but are unnecessarily used to describe a specific sequence or order. It is to be understood that the data is interchangeable where appropriate, so that the embodiments of the present disclosure can be implemented in an order other than those illustrated or described, and that the objects distinguished by "first", "second", and the like are generally of the same class, without limiting the number of objects, for example, the first object may be one or more. In addition, "and/or" used in this specification and the claims represents at least one of the connected objects. The character "/" generally indicates that the related object is an "or" relationship.

In the embodiments of the present disclosure, the word such as "exemplarily" or "for example" is used to mean serving as an example, an illustration, or a description. Any embodiment or design scheme described as "exemplarily" or "for example" in the embodiments of the present disclosure should not be construed as being preferred or superior to other embodiments or design schemes. To be specific, the use of the word such as "exemplarily" or "for example" is intended to present the related concepts in a specific manner.

In the description of the embodiments of the present disclosure, "plurality" means two or more unless otherwise described. For example, a plurality of processing units refer to two or more than two processing units; and a plurality of elements refer to two or more than two elements.

It is to be noted that the characters, symbols, and images used to indicate information in the embodiments of the present disclosure may use controls or other containers as carriers to display information, including but not limited to character identifiers, symbol identifiers and image identifiers.

The image display method and apparatus, and the electronic device provided by the embodiments of the present disclosure are described in detail by embodiments and their application scenarios in combination with the attached drawings.

The image display method provided by the embodiments of the present disclosure can be applied to the scenario where images or videos including no unwanted object are obtained during a motion process. In some embodiments, in the case of a target shooting mode, the electronic device may shoot M frame images in response to a first input from a user. In the case that a first image among the M frame images includes a target object (that is, the first image includes an unwanted object (namely the target object) blocking the landscape that the user needs to capture), the electronic device performs first processing on the first image (that is, removes the target object in the first image based on at least one frame image among the M frame images), to obtain a second image, and displays the second image (the image of the landscape that is not blocked by the unwanted object and the user needs to capture) in a first display region of the electronic device. Through this solution, in the case that the electronic device is in the target shooting mode, the user can trigger the electronic device to obtain the second image with no unwanted object by one input, which simplifies the operation steps, thereby improving the efficiency with which the electronic device captures unobstructed images in the motion shooting scenario.

Referring to FIG. 1, the embodiments of the present disclosure provide an image display method. The image display method provided by the embodiments of the present disclosure is described below with the example in which an execution object is an electronic device. This method may include step 201 to step 203.

Step 201. In the case that the electronic device is in a target shooting mode, the electronic device receives a first input from a user.

It is to be understood that in the embodiments of the present disclosure, the target shooting mode may be a motion shooting mode, for example, a car-ride shooting mode, a boat-ride shooting mode, or a flight shooting mode. The target shooting mode may be other shooting modes, which is not limited in the embodiments of the present disclosure.

It is to be understood that in the embodiments of the present disclosure, during a motion process (for example, a car ride process, which is described below as an example of the motion process), if the user needs to capture an image with no unwanted object, the user may click a "Target Shooting" mode button after the electronic device starts a camera application, to trigger the electronic device into the target shooting mode (such as the specific process for car-ride shooting).

In the embodiments of the present disclosure, the target shooting mode includes a target photo mode and a target video mode. Exemplarily, if the target shooting mode is the car-ride shooting mode, the target photo mode is a car-ride photo mode, and the target video mode is a car-ride video mode. If the target shooting mode is the boat-ride shooting mode, the target photo mode is a boat-ride photo mode, and the target video mode is a boat-ride video mode. If the target shooting mode is the flight shooting mode, the target photo mode is a flight photo mode, and the target video mode is a flight video mode.

In some embodiments, the first input may be a click input from the user on a shooting interface, or a slide input from the user on a shooting interface, or other feasible inputs, which may be determined based on an actual need. There is no limitation in the embodiments of the present disclosure.

Exemplarily, the click input may be based on any number of clicks, such as, a single-click input, a double-click input, or may be a short-press input or a long-press input. The slide input may be a slide input in any direction, such as, an upward slide input, a downward slide input, a leftward slide input, a rightward slide input, or may be other types of slide inputs, such as, a two-finger slide input, a three-finger slide input, and the like.

Step 202. The electronic device shoots M frame images in response to the first input.

M is an integer greater than 1.

It is to be understood that in the embodiments of the present disclosure, the electronic device shoots the M frame images by a camera in the target shooting mode.

In the embodiments of the present disclosure, the M frame images may be captured by one camera, or by a plurality of cameras (in this case, the electronic device may obtain a plurality of frame images from different angles, which is more conducive to removing the unwanted object in the image), which may be determined based on an actual need. There is no limitation in the embodiments of the present disclosure.

In the embodiments of the present disclosure, the value of M may be preset or calculated by the electronic device according to an actual situation, which may be determined based on an actual need. There is no limitation in the embodiments of the present disclosure.

Exemplarily, M is 6, 8, 9, 10, 20, 30, 50, or other values, which may be determined according to a move speed of the electronic device, or a capturing frame rate of the electronic device.

Step 203. In the case that a first image among the M frame images includes a target object, the electronic device displays a second image in a first display region.

The second image is an image after the first image is subjected to first processing. The first processing is to remove the target object in the first image based on at least one frame image among the M frame images. The at least one frame image does not include the first image.

It is to be understood that in the embodiments of the present disclosure, in the case that the first image among the M frame images include the target object, the electronic device determines that the first image includes an unwanted object (namely, the target object). Based on at least one frame image (which may be called a reference image) among the M frame images, the electronic device removes the target object in the first image (which may be called a base image), to obtain the second image, and displays the second image in the first display region of the electronic device.

Figures 2A, 2B, 2C:
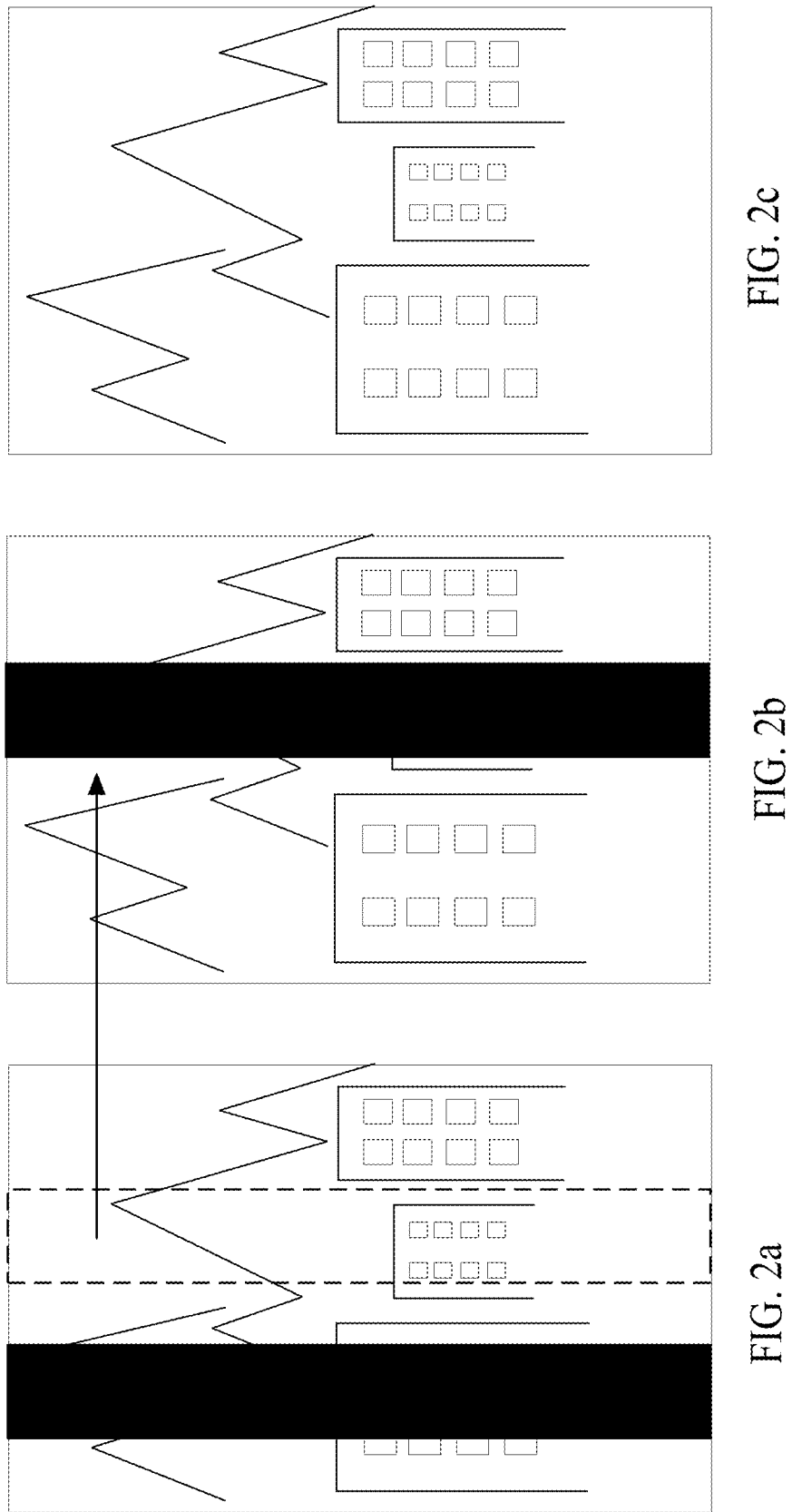
FIGS. 2a-2c are first schematic diagrams showing image processing of an image display method according to an embodiment of the present disclosure.

Exemplarily, the example in which the first processing is to remove the target object in the first image (the base image) based on one frame image (the reference image) among the M (M is 10) frame images is described below. The specific process of the first processing is as follows: the electronic device shoots 10 frame images; obtains cache data corresponding to the tenth frame image (namely the first image) and the first frame image (namely the reference image) among the 10 frame images for calculation, to determine a position (called position one below) where a street lamp (namely the target object) is located in the tenth frame image; obtains corresponding positions of the two images (the first image and the tenth image) through a feature point matching method (such as Harris corner matching); adjusts the angle of the first image through affine transformation, to allow the angle of the image (the first frame image after being adjusted through the affine transformation) to be consistent with the angle of the tenth frame image; obtains the image area (called image area one below) corresponding to the position one from the first image after being adjusted through the affine transformation; and finally, combines the image area one with the tenth frame image, to obtain an image (namely the second image) without the street lamp. FIG. 2*a* shows the first frame image after being adjusted through the affine transformation, where the area within the dotted box is the image area one; FIG. 2*b* shows the tenth frame image (the first image); and FIG. 2*c* shows the tenth frame image (the second image) with the street lamp being removed.

It is to be noted that in the embodiments of the present disclosure, the black area in the figures represents the target object, which may be an electric wire pole, a street lamp, or the like. There is no limitation in the embodiments of the present disclosure.

Figure 3:
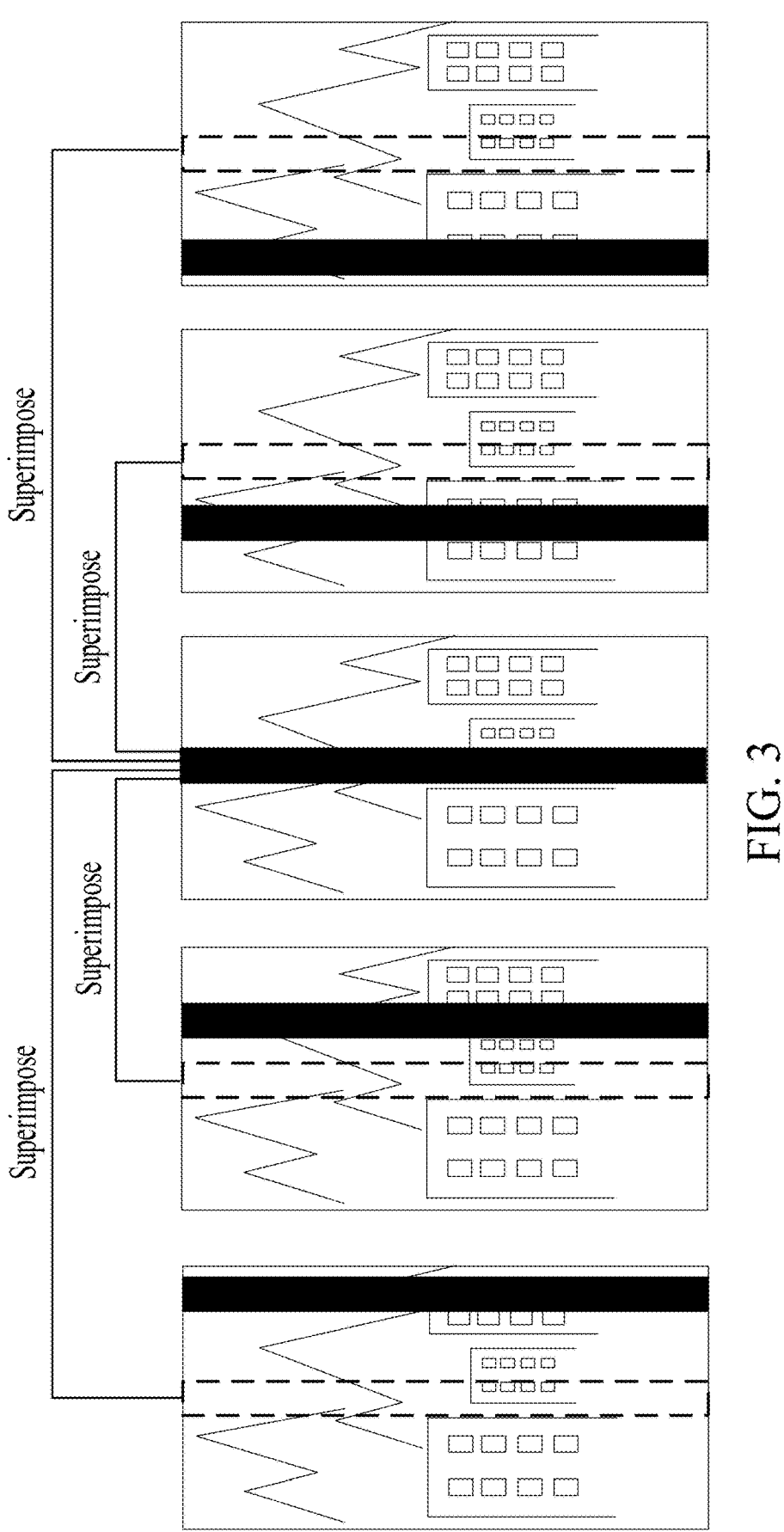
FIG. 3 is a second schematic diagram showing image processing of an image display method according to an embodiment of the present disclosure.

Exemplarily, the example in which the first processing is to remove the target object in the first image based on four frame images among the M (M is 5) frame images (such as, removing the street lamp in the first image using a multi-frame image processing technology) is described below. The electronic device obtains a plurality of frame images for calculation; determines the position (called position two below) where the street lamp is located in the base frame image (the middle frame is used as the base frame image, for example, the third frame image is used as the base frame image in the case of capturing five frame images); obtains corresponding positions of the other four frame images using the feature point matching method (such as the Harris corner matching); adjusts the angles of the other four frame images through affine transformation, to allow the angles of the other four images after being adjusted through the affine transformation to be consistent with the angle of the base frame image; obtains the image area corresponding to the position two where the street lamp is located in the base frame image from the other four images after being adjusted through the affine transformation; and finally obtains the image without the street lamp. As shown in FIG. 3, the middle image is the base frame image, and the other images are the other four frames after being adjusted through the affine transformation. The area within the dotted line box is the image area corresponding to the position two.

In the embodiments of the present disclosure, if there are more reference images, the image area used for replacing the target object has more details, thereby improving the effect of the second image.

In the embodiments of the present disclosure, step 203 may be implemented by step 203*a*.

Step 203*a*. In the case that the first image among the M frame images includes the target object, the electronic device displays the second image in the first display region and a third image in a second display region.

The second display region is different from the first display region. It is to be understood that the second display region and the first display region are different display regions on the electronic device.

In the case that the target shooting mode is the target video mode, the third image includes the first image. In the case that the target shooting mode is the target photo mode, the third image includes at least one of the following: the first image, a fourth image, or a fifth image. The fourth image is an image (namely, an image including the unwanted object, where the unwanted object is clear) after the target object in the first image is subjected to motion denoising processing. The fifth image is an image (namely, an artistic trail style image) after the target object in the first image is subjected to motion trail enhancement processing.

It is to be understood that in the embodiments of the present disclosure, in the case that the target shooting mode is the target video mode, the electronic device displays the second images (the images without the unwanted object) in the first display region, and the first images (the original images with the unwanted object) in the second display region.

Figure 4:
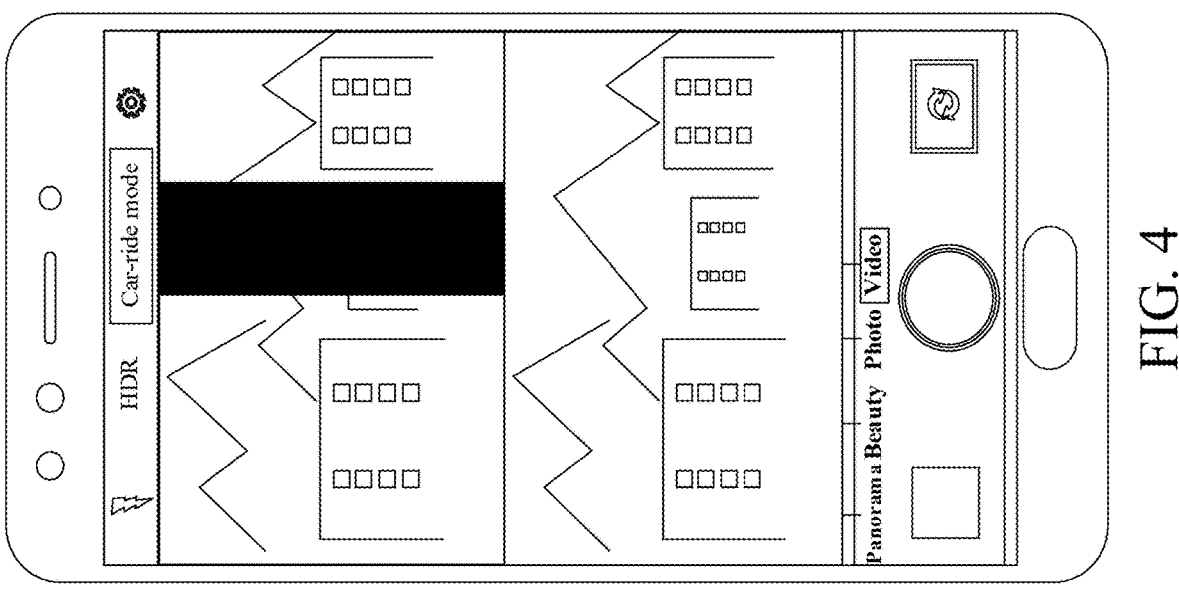
FIG. 4 is a first schematic diagram showing an interface of an image display method according to an embodiment of the present disclosure.

Exemplarily, the electronic device simultaneously transmits the first images and the second images to a screen for real-time display. As shown in FIG. 4, the upper display region of the screen of the electronic device is the second display region, and the lower display region of the screen is the first display region. The upper display region of the screen plays the original video images, and the lower display region of the screen plays the video images with the target object being removed.

It is to be understood that in the case that the target shooting mode is the target photo mode, the electronic device displays the second image (without the unwanted object) in the first display region, and displays at least one of the following images in the second display region: the first image (the original image including the unwanted object), the fourth image (the image including the clear unwanted object), or the fifth image (the artistic trail style image).

Exemplarily, M is 5, and the target object is a street lamp. In the target photo mode, in response to that the user clicks to take photos, the camera of the electronic device starts to acquire image data, for example, five frame images in real time. Then, the electronic device processes the five frame images using a digital image processing technique, to obtain three types of images: performing motion denoising processing on the plurality of frame images using a motion snapshot algorithm, to obtain the image including the clear street lamp (relative to the first image), namely the fourth image; and performing superimposition processing on the plurality of frame images using an artistic style algorithm, which enhances the motion trail of the street lamp in the image (relative to the first image), to obtain the artistic image in which the street lamp has a longer trail, namely the fifth image.

Figure 5:
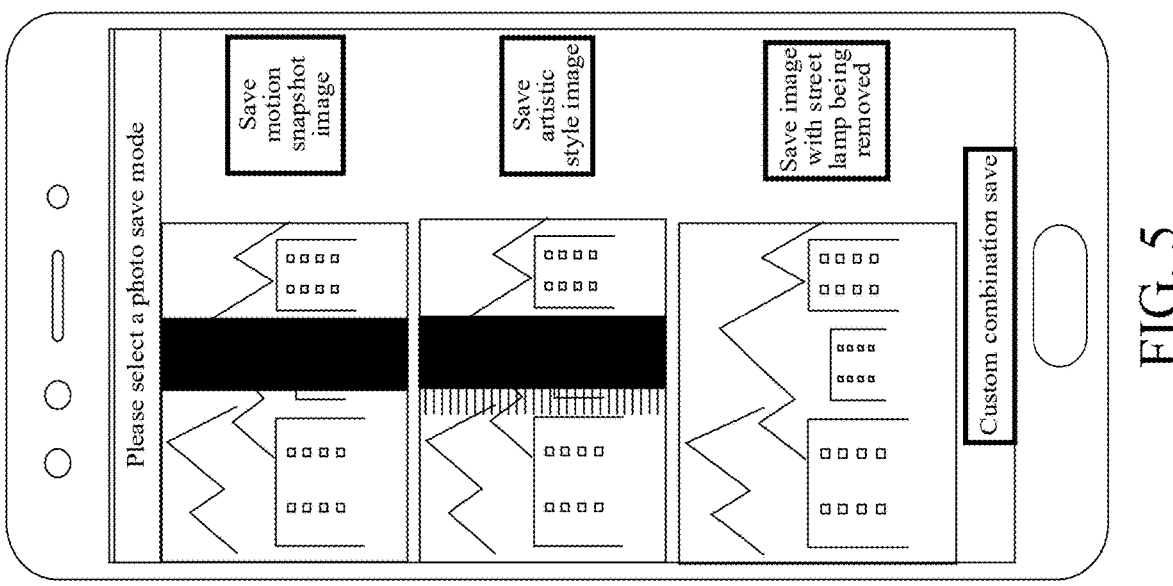
FIG. 5 is a second schematic diagram showing an interface of an image display method according to an embodiment of the present disclosure.

Exemplarily, the third image includes the fourth image and the fifth image, and the electronic device simultaneously transmits the second image, the fourth image, and the fifth image to the screen for real-time display. As shown in FIG. 5, the upper display region of the screen of the electronic device is the second display region, and the lower display region of the screen is the first display region. The second display region includes a first region and a second region. The first region is the upper display region of the screen of the electronic device, the second region is the middle display region of the screen of the electronic device screen, and the first display region is the lower display region of the screen. The first region displays the motion snapshot image, the second region displays the artistic style image, and the first display region displays the image with the target object (street lamp) being removed.

In the embodiments of the present disclosure, different styles of images are displayed simultaneously in different regions of the electronic device. This provides the user with multiple choices, so that the user can choose the desired image according to his/her own need.

In the embodiments of the present disclosure, in the case of the target shooting mode, the electronic device may shoot the M frame images in response to the first input from the user. In the case that the first image among the M frame images includes the target object (that is, the first image includes the unwanted object (namely the target object) blocking the landscape that the user needs to capture), the electronic device performs the first processing on the first image (that is, removes the target object in the first image based on at least one frame image among the M frame images), to obtain the second image, and displays the second image (the image of the landscape that is not blocked by the unwanted object and the user needs to capture) in the first display region of the electronic device. Through this solution, in the case that the electronic device is in the target shooting mode, the user can trigger the electronic device to obtain the second image with no unwanted object by one input, which simplifies the operation steps, thereby improving the efficiency with which the electronic device captures unobstructed images in the motion shooting scenario.

In the embodiments of the present disclosure, after step 203*a*, the user may trigger the electronic device by inputs, to save the images of different styles.

Exemplarily, after step 203*a*, the image display method provided by the embodiments of the present disclosure may further include step 204 to step 205.

Step 204. The electronic device receives a second input from the user.

In some embodiments, the second input may include a click input on a target image by the user, a slide input on the target image, or other feasible inputs, which may be determined based on an actual need. There is no limitation in the embodiments of the present disclosure.

Exemplarily, the click input and the slide input may refer to the relevant content in the description of the first input in step 201, which are detailed herein.

Step 205. The electronic device saves a target image in response to the second input.

The target image includes at least one of the following: the second image, a sixth image, or a composite image. The sixth image is at least one image included in the third image. The composite image is an image combined by at least two images among seventh images. The seventh images include: the second image, and all the images included in the third image (namely all the images included in the third image).

Figure 6:
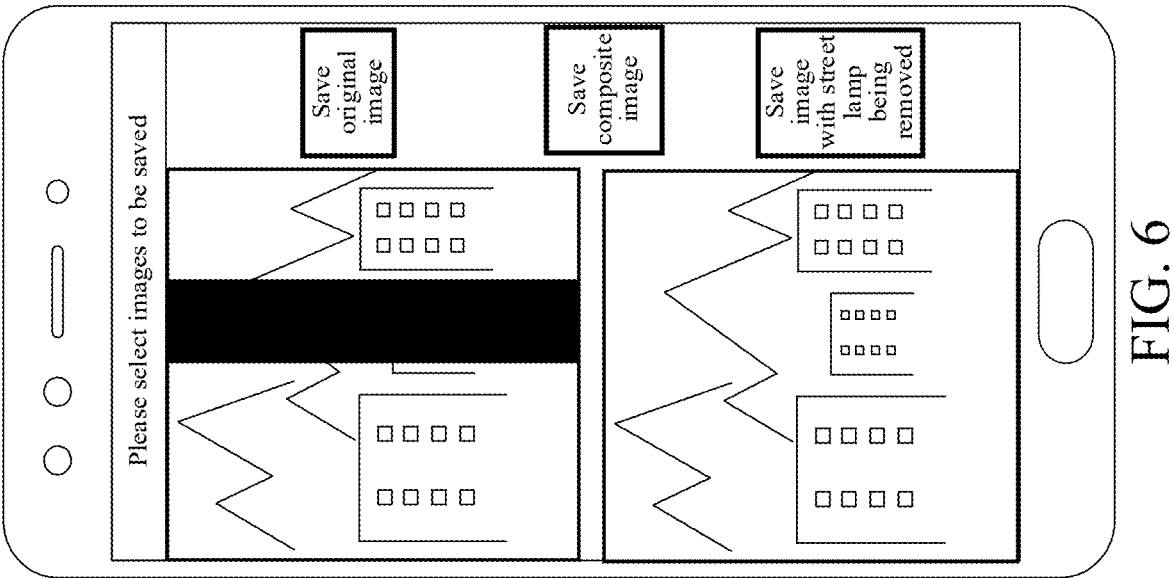
FIG. 6 is a third schematic diagram showing an interface of an image display method according to an embodiment of the present disclosure.
Figures 7A, 7B, 7C:
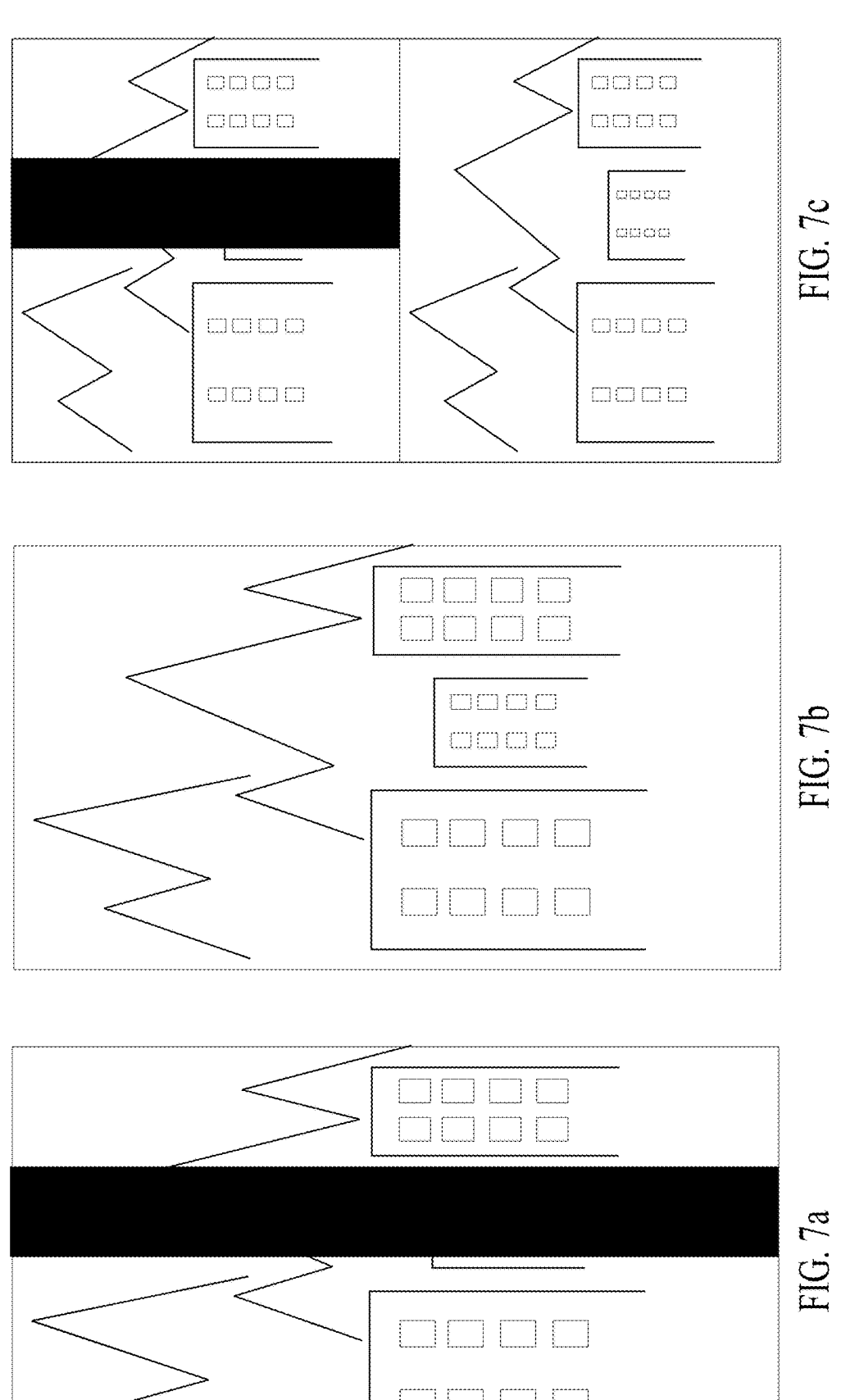
FIGS. 7a-7c are schematic diagrams showing image processing of an image display method according to an embodiment of the present disclosure.

Exemplarily, if the third image is the first image, the sixth image is the first image. Correspondingly, the seventh images are the first image and the second image, and the composite image is a composite image of the first image and the second image. As shown in FIG. 6, there is a corresponding "Save original image" button on the right side of the first image, a corresponding "Save image after removing street lamp (target object)" button on the right side of the second image, and a "Save composite image" button in the middle (used to save the composite image of the first image and the second image). If the user selects the "Save original image" button, the electronic device saves the original image (that is, saves the first image, and in the case of the target video mode, saves the original video). If the user selects the "Save image after removing street lamp" button, the electronic device saves the image after the street lamp is removed (that is, saves the second image, and in the case of the target video mode, saves the video after the street lamp is removed). If the user selects the "Save composite image" button, the electronic device saves the composite image (that is, saves the composite image, and in the case of the target video mode, saves the composite video). FIG. 7*a* to FIG. 7*c* show the saved first image, the saved second image, and the saved composite image, respectively.

Exemplarily, if the third image includes the fourth image and the fifth image, the sixth image is at least one of the following: the fourth image or the fifth image. Correspondingly, the seventh images are the second image, the fourth image, and the fifth image. The composite image is at least one of the following: a composite image of the second image and the fourth image, a composite image of the fourth image and the fifth image, or a composite image of the second image and the fifth image. As shown in FIG. 5, there is a corresponding image save button on the right side of the corresponding image, such as, a "Save motion snapshot image" button for saving the fourth image, a "Save artistic style image" button for saving the fifth image, a "Save image after removing street lamp" button for saving the second image, and a "Custom combination save" button at the bottom of the electronic device for saving the composite image.

In the embodiments of the present disclosure, with no need to switch operations or perform image processing, the user can save the images separately or in a customized combination manner according to his/her requirement, thereby improving the operational efficiency of the user.

In the embodiments of the present disclosure, in the case that the target image includes the composite image, before step 204, the user can determine to combine which images into the composite image by an input.

Exemplarily, in the case that the target image includes the composite image, before step 204, the image display method provided by the embodiments of the present disclosure may further include step 206 to step 207.

Step 206. The electronic device receives a third input from the user.

In some embodiments, the third input may be a click input on at least two images by the user, a drag input on at least two images by the user, or other feasible inputs, which may be determined based on an actual need. There is no limitation in the embodiments of the present disclosure.

Exemplarily, the click input may refer to the relevant content in the description of the first input in step 201, which is not detailed herein.

Exemplarily, the drag input may be a drag input in any direction, such as, an upward drag input, a downward drag input, a leftward drag input, a rightward drag input, a clockwise drag input, a counter-clockwise drag input.

In some embodiments, the third input is the input that the user drags at least two images to a target region. The target region is configured to trigger the composition of the at least two images into the target image.

Step 207. The electronic device determines at least two images from the seventh images in response to the third input.

It is to be understood that in the embodiments of the present disclosure, the user triggers the electronic device to determine which images need to be combined into the composite image by the third input. The electronic device can directly combine the at least two images into the composite image. The user may edit the at least two images by another input, and then trigger the composition, to obtain the composite image by the input.

In the embodiments of the present disclosure, the user can select which images to be combined into the composite image by the third input according to his/her need, thereby quickly obtaining the image that meets the his/her requirement. Compared with composition using the image editing software, this manner simplifies the operation steps, thereby improving the operation efficiency.

Exemplarily, in the case that the target image includes the composite image, after step 207, the image display method provided in the embodiments of the present disclosure may further include step 208 to step 209.

Step 208. The electronic device receives a fourth input from the user.

In some embodiments, the fourth input may be a click input on an eighth image by the user, or a drag input on the eighth image by the user, or a rotation input on the eighth image by the user, or other feasible inputs, which may be determined based on an actual need. There is no limitation in the embodiments of the present disclosure.

Exemplarily, the click input may refer to the relevant content in the description of the first input in step 201, which is not detailed herein. The drag input may refer to the relevant content in the description of the third input in step 206, which is not detailed herein.

Exemplarily, the rotation input may be in a clockwise rotation input or in a counter-clockwise rotation input.

Step 209. The electronic device performs a target operation in response to the fourth input.

The target operation includes at least one of the following: adjusting a position of the eighth image in the at least two images, adjusting a size of the eighth image, rotating a direction of the eighth image, deleting the eighth image, or adding text in a blank area where the eighth image is located.

Figure 8:
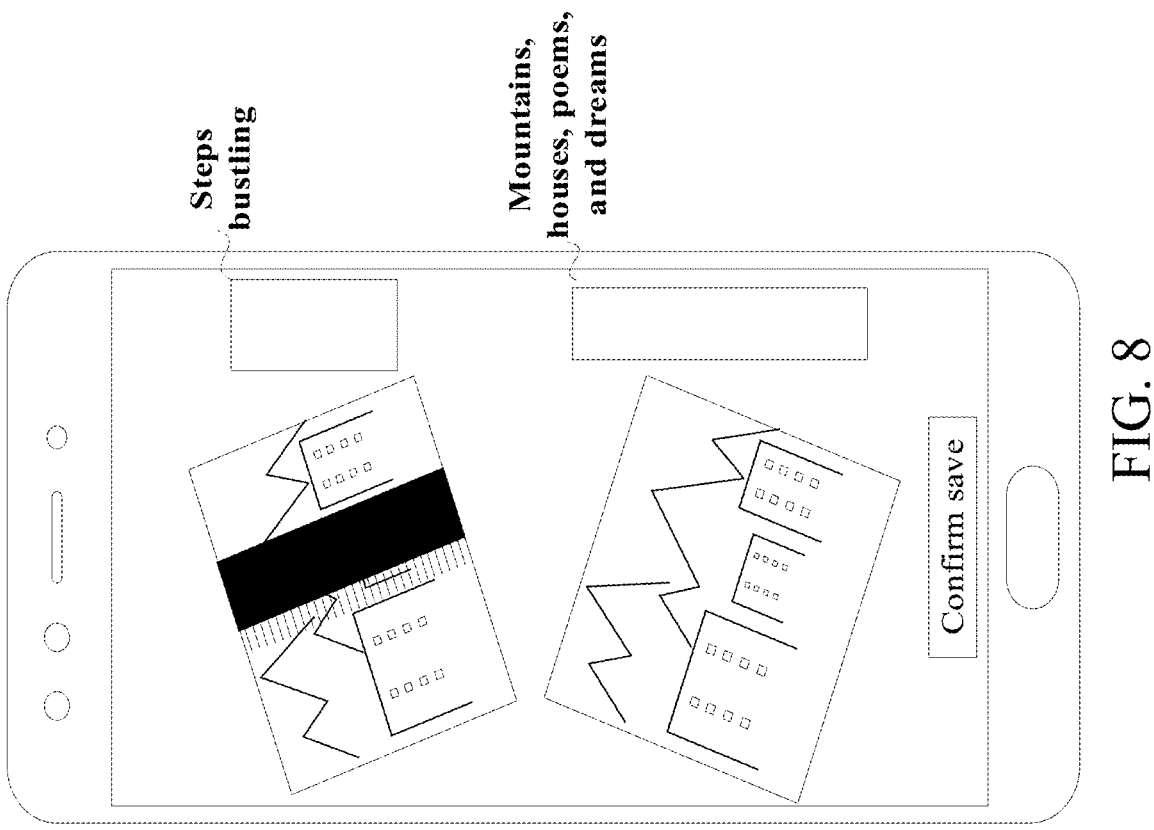
FIG. 8 is a fourth schematic diagram showing an interface of an image display method according to an embodiment of the present disclosure.

Exemplarily, referring to FIG. 5, before the user selects to save images in the customized combination manner, the "Custom combination save" button is grayed out (disabled) and cannot be pressed. After the user drags the images that needs to be saved in the customized combination manner to a "Custom combination save" box, and the quantity of the images reaches two, the "Custom combination save" button can be pressed (enabled). Then, the electronic device enters an edit interface, to allow the user to adjust the position of a certain image by an input (for example, adjust the position of each image by long pressing the corresponding image), or add text (for example, add text, such as the text on the right side in FIG. 8, by long pressing the blank area). Then, the user may click the "Save" button (such as the "Confirm save" button shown in FIG. 8) to save the combination.

In the embodiments of the present disclosure, the user may edit the at least two images by the fourth input, to obtain the composite image required by the user. The operation is simple and convenient, thereby improving the operational efficiency.

Exemplarily, before step 202, the image display method provided by the embodiments of the present disclosure may further include step 210 to step 211.

Step 210. The electronic device obtains a horizontal move speed of the electronic device.

Step 211. The electronic device determines the value of M based on the horizontal move speed.

Exemplarily, if the horizontal move speed is relatively large, the value of M is relatively small; and if the horizontal move speed is relatively small, the value of M is relatively large. The specific value may be determined based on an actual need, which is not limited in the embodiments of the present disclosure.

In the embodiments of the present disclosure, the value of M is determined based on the horizontal move speed of the electronic device, which helps to obtain the second image more quickly and conveniently, thereby improving the efficiency of obtaining the second image.

It is to be noted that in the embodiments of the present disclosure, step 210 to step 211 may be executed before or after step 201, which is not limited in the embodiments of the present disclosure.

Exemplarily, before step 203, the image display method provided by the embodiments of the present disclosure may further include step 212.

Step 212. The electronic device determines the first image from the M frame images.

Exemplary, step 212 may be implemented by step 101, step 102, or step 103.

Step 101. The electronic device determines any one frame image among the M frame images as the first image.

Step 102. The electronic device determines the image among the M frame images that is selected by the user as the first image.

Step 103. The electronic device determines any one frame image among the M frame images whose image quality meets a preset condition as the first image.

It is to be understood that the preset condition is determined in advance, which is not limited in the embodiments of the present disclosure.

It is to be understood that if the target shooting mode is the target video mode, the electronic device needs to perform the first processing on each frame image, to obtain the image without the unwanted object. Therefore, when performing the first processing on any one frame image, the frame image is the first image. If the target shooting mode is the target photo mode, the electronic device may determine the first image according to step 101, step 102, or step 103.

Exemplarily, before step 203, the image display method provided by the embodiments of the present disclosure may further include step 213.

Step 213. The electronic device determines that the first image includes the target object.

Exemplary, step 213 may be implemented by at least one of the following: step 104, step 105, or step 106.

Step 104. The electronic device recognizes that the first image includes a first object using an image recognition technology.

The first object is the target object, and the first object is a preset object.

It is to be understood that in the embodiments of the present disclosure, a plurality of preset objects (such as a telegraph pole, a street lamp, and the like) may be set in advance. In response to detecting the first object among the preset objects in the first image, the first image is determined to include the target object.

Step 105. When capturing the first image, the electronic device detects that a target field of view includes a second object whose distance from the electronic device is less than or equal to a first threshold.

The second object is the target object, and the target field of view is a field of view of the camera capturing the first image.

It is to be understood that in the embodiments of the present disclosure, the first threshold may be determined according to an actual need, which is not limited in the embodiments of the present disclosure.

Step 106. The electronic device detects that the first image includes a third object selected by the user.

The third object is the target object.

It is to be understood that in the case that step 213 includes step 104 and step 105, the first object and the second object may be the same or different. If the first object is different from the second object, the target object includes the first object and the second object. In the case that step 213 includes step 104 and step 106, the first object and the third object may be the same or different. If the first object is different from the third object, the target object includes the first object and the third object. In the case that step 213 includes step 105 and step 106, the second object and the third object may be the same or different. If the second object is different form the third object, the target object includes the second object and the third object. In the case that step 213 includes step 104, step 105, and step 106, the first object, the second object and the third object may be the same or different. If at least two objects among the first object, the second object and the third object are different, the target object includes at least two different objects.

In the embodiments of the present disclosure, in the target video mode, the electronic device can remove the unwanted object in the original video images using a frame buffering technology, to provide the user with three types of video data: the original video data, the video data with the unwanted object being removed, and the composite video data of two types of videos. This method not only removes the unwanted object from the video recorded during the user's motion, but also provides the user with a better recording experience. In addition, the user is allowed to selectively save the composite video, thereby making the shooting more entertaining.

In the embodiments the present disclosure, in the target photo mode, the electronic device can remove the unwanted object in the image using the multi-frame image processing technology. In this way, the unwanted object can be removed from the image, to obtain the image without the unwanted object. In addition, by generating the motion snapshot image and the image with the trail enhanced, the user is provided with a variety of alternative combinations, thereby improving user experience and making the shooting more entertaining during the user's motion shooting process.

It is to be noted that the image display method provided by the embodiments of the present disclosure may be executed by an image display apparatus, or by a functional module and/or functional entity used to execute the image display method in the image display apparatus. In the embodiments of the present disclosure, as an example, the image display apparatus is used to perform the image display method provided by the embodiments of the present disclosure.

Figure 9:
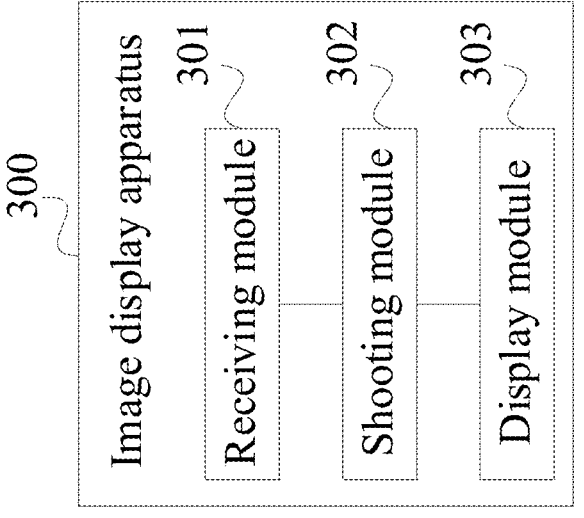
FIG. 9 is a schematic structural diagram of an image display apparatus according to an embodiment of the present disclosure.

FIG. 9 is a schematic structural diagram of an image display apparatus according to an embodiment of the present disclosure. As shown in FIG. 9, the image display apparatus 300 may include: a receiving module 301, a shooting module 302, and a display module 303. The receiving module 301 is configured to receive a first input from a user, in the case that an electronic device is in a target shooting mode. The shooting module 302 is configured to shoot M frame images in response to the first input received by the receiving module. The display module 303 is configured to display a second image in a first display region, in the case that a first image among the M frame images includes a target object. The second image is an image after the first image is subjected to first processing, the first processing is to remove the target object in the first image based on at least one frame image among the M frame images, the at least one frame image does not include the first image, and M is an integer greater than 1.

In some embodiments, the display module 303 is configured to, in the case that the first image among the M frame images includes the target object, display the second image in the first display region and a third image in a second display region. The second display region is different from the first display region. In the case that the target shooting mode is a target video mode, the third image includes the first image. In the case that the target shooting mode is a target photo mode, the third image includes at least one of the following: the first image, a fourth image, or a fifth image. The fourth image is an image after the target object in the first image is subjected to motion denoising processing. The fifth image is an image after the target object in the first image is subjected to motion trail enhancement processing.

In some embodiments, the image display apparatus further includes: a saving module. The receiving module 301 is further configured to, in the case that the first image among the M frame images includes the target object, receive a second input from the user, after the display module displays the second image in the first display region and the third image in the second display region. The saving module is configured to save a target image in response to the second input received by the receiving module. The target image includes at least one of the following: the second image, a sixth image, or a composite image. The sixth image is at least one image included in the third image. The composite image is an image combined by at least two images among seventh images. The seventh images include: the second image and all images included in the third image.

In some embodiments, the image display apparatus further includes: a determining module. The receiving module 301 is further configured to, in the case that the target image includes the composite image, receive a third input from the user, before receiving the second input from the user. The determining module is configured to determine the at least two images from the seventh images in response to the third input received by the receiving module.

In some embodiments, the third input is the input that the user drags at least two images to a target region. The target region is configured to trigger the composition of the at least two images into the target image.

In some embodiments, the image display apparatus further includes: an executing module. The receiving module 301 is further configured to receive a fourth input from the user, after determining the at least two images from the seventh images. The executing module is configured to perform a target operation in response to the fourth input received by the receiving module. The target operation includes at least one of the following: adjusting a position of the eighth image in the at least two images, adjusting a size of the eighth image, rotating a direction of the eighth image, deleting the eighth image, or adding text in a blank area where the eighth image is located.

In some embodiments, the image display apparatus further includes: an obtaining module and a determining module. The obtaining module is configured to obtain a horizontal move speed of the electronic device before shooting the M frame images. The determining module is configured to determine the value of M based on the horizontal move speed obtained by the obtaining module.

The embodiments of the present disclosure provide the image display apparatus. In the embodiments of the present disclosure, in the case that the electronic device is in the target shooting mode, the image display apparatus may shoot M frame images in response to the first input from the user. In the case that the first image among the M frame images includes the target object (that is, the first image includes an unwanted object (namely the target object) blocking the landscape that the user needs to capture), the electronic device performs the first processing on the first image (that is, removes the target object in the first image based on at least one frame image among the M frame images), to obtain the second image, and displays the second image (the image of the landscape that is not blocked by the unwanted object and the user needs to capture) in the first display region of the image display apparatus. Through this solution, in the case that the electronic device is in the target shooting mode, the user can trigger the image display apparatus to obtain the second image with no unwanted object by one input, which simplifies the operation steps, thereby improving the efficiency with which the electronic device captures unobstructed images in the motion shooting scenario.

The image display apparatus in the embodiments of the present disclosure may be an apparatus, or an electronic device, or a component, an integrated circuit, or a chip of an electronic device. The electronic device in the embodiments of the present disclosure may be a mobile electronic device or may be a non-mobile electronic device. For example, the mobile electronic device may be a mobile phone, a tablet computer, a notebook computer, a palm computer, an in-vehicle terminal, a wearable device, an ultra-mobile personal computer (UMPC), a netbook, or a personal digital assistant (PDA); and the non-mobile electronic device may be a personal computer (PC), a television (TV), a teller machine, or an automated machine, which are not specifically limited in the embodiments of the present disclosure.

The image display apparatus in the embodiments of the present disclosure may be an apparatus with an operating system. The operating system may be an Android operating system, an iOS operating system, or other possible operating systems, which is not specifically limited in the embodiments of the present disclosure.

The image display apparatus according to this embodiment of the present disclosure can implement all processes implemented by the electronic device described in the relevant embodiments shown in FIG. 1 to FIG. 8, details of which are omitted here for brevity.

Figure 10:
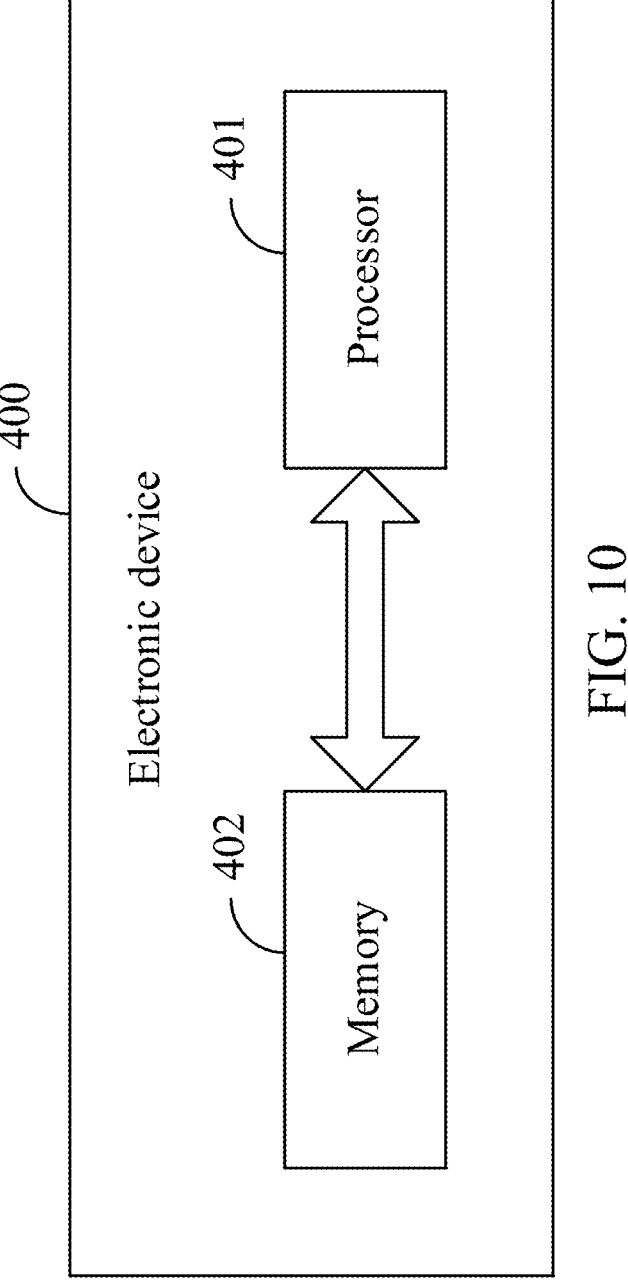
FIG. 10 is a schematic structural diagram of an electronic device according to an embodiment of the present disclosure.

As shown in FIG. 10, the embodiments of the present disclosure further provide an electronic device 400, including a processor 401, a memory 402, and a program or instructions on the memory 402 and executed on the processor 401. The program or the instructions, when executed by the processor 401, implement the processes of the image display method of any of the foregoing embodiments, and can achieve the same technical effects. To avoid repetition, details are not described herein again.

It is to be noted that the electronic device in the embodiments of the present disclosure may include a mobile electronic device or a non-mobile electronic device.

Figure 11:
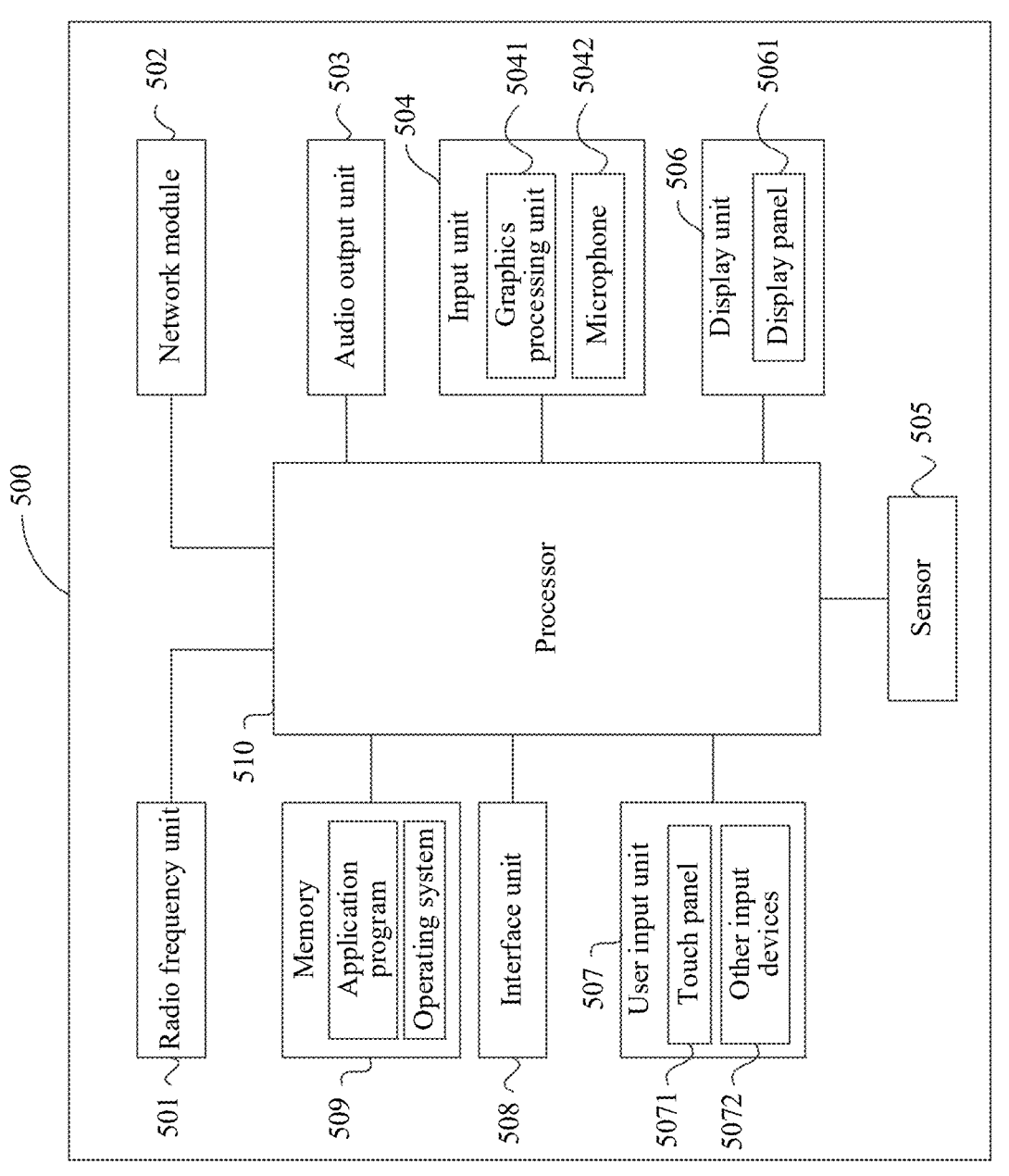
FIG. 11 is a schematic diagram of a hardware structure of an electronic device according to an embodiment of the present disclosure.

FIG. 11 is a schematic diagram of a hardware structure of an electronic device for implementing the embodiments of the present disclosure. The electronic device 500 includes but is not limited to: components such as a radio frequency unit 501, a network module 502, an audio output unit 503, an input unit 504, a sensor 505, a display unit 506, a user input unit 507, an interface unit 508, a memory 509, and a processor 510.

In the embodiments of the present disclosure, the input unit 504 includes a camera.

The electronic device 500 may further include a power supply (such as a battery) for supplying power to the components. In some embodiments, the power supply may be logically connected to the processor 510 by a power management system, thereby implementing functions, such as charging, discharging, and power consumption management, by the power management system. The structure of the electronic device shown in FIG. 11 constitutes no limitation on the electronic device. The electronic device may include more or fewer components than those shown in the figure, or some components may be combined, or a different component deployment may be used.

The user input unit 507 is configured to receive a first input from a user, in the case that the electronic device is in a target shooting mode. The input unit 504 is configured to shoot M frame images in response to the first input. The display unit 506 is configured to display a second image in a first display region, in the case that a first image among the M frame images includes a target object. The second image is an image after the first image is subjected to first processing, the first processing is to remove the target object in the first image based on at least one frame image among the M frame images, the at least one frame image does not include the first image, and M is an integer greater than 1.

In some embodiments, the display unit 506 is configured to display the second image in the first display region and a third image in a second display region, in the case that the first image among the M frame images includes the target object. The second display region is different from the first display region. In the case that the target shooting mode is a target video mode, the third image includes the first image. In the case that the target shooting mode is a target photo mode, the third image includes at least one of the following: the first image, a fourth image, or a fifth image. The fourth image is an image after the target object in the first image is subjected to motion denoising processing. The fifth image is an image after the target object in the first image is subjected to motion trail enhancement processing.

In some embodiments, the user input unit 507 is further configured to, in the case that the first image among the M frame images includes the target object, receive a second input from the user, after displaying the second image in the first display region and the third image in the second display region. The processor 510 is configured to save a target image in response to the second input. The target image includes at least one of the following: the second image, a sixth image, or a composite image. The sixth image is at least one image included in the third image, and the composite image is an image obtained by combining at least two images among seventh images. The seventh images include the second image and all images included in the third image.

In some embodiments, the user input unit 507 is further configured to, in the case that the target image includes the composite image, receive a third input from the user, before receiving the second input from the user. The processor 510 is configured to determine the at least two images from the seventh images in response to the third input.

In some embodiments, the third input is an input that the user drags the at least two images to a target region, and the target region is configured to trigger the composition of the at least two images into the target image.

In some embodiments, the user input unit 507 is further configured to receive a fourth input from the user, after determining the at least two images from the seventh images. The processor 510 is configured to perform a target operation in response to the fourth input received by the receiving module. The target operation includes at least one of the following: adjusting a position of an eighth image in the at least two images, adjusting a size of the eighth image, rotating a direction of the eighth image, deleting the eighth image, or adding text in a blank area where the eighth image is located.

In some embodiments, the processor 510 is further configured to obtain a horizontal move speed of the electronic device, before shooting the M frame images; and determine the value of M based on the horizontal move speed.

According to the electronic device provided by the embodiments of the present disclosure, in the case of the target shooting mode, the electronic device may shoot the M frame images in response to the first input from the user. In the case that the first image among the M frame images includes the target object (that is, the first image includes the unwanted object (namely the target object) blocking the landscape that the user needs to capture), the electronic device performs the first processing on the first image (namely, removing the target object in the first image based on at least one frame image among the M frame images), to obtain the second image, and displays the second image (the image of the landscape that is not blocked by the unwanted object and the user needs to capture) in the first display region of the electronic device. Through this solution, in the case that the electronic device is in the target shooting mode, the user can trigger the electronic device to obtain the second image with no unwanted object by one input, which simplifies the operation steps, thereby improving the efficiency with which the electronic device captures unobstructed images in the motion shooting scenario.

It is to be understood that in this embodiment of the present disclosure, the radio frequency unit 501 may be configured to receive and transmit information or receive and transmit a signal during a call. In some embodiments, after downlink data from a base station is received, the downlink data is sent to the processor 510 for processing. In addition, uplink data is sent to the base station. In addition, the radio frequency unit 501 may further communicate with a network and other devices via a wireless communication system. The electronic device provides wireless broadband Internet access to a user by the network module 502, for example, helps the user to send and receive an email, browse a web-page, access stream media, and the like. The audio output unit 503 may convert audio data received by the radio frequency unit 501 or the network module 502 or audio data stored in the memory 509 into an audio signal and output the audio signal as sound. Moreover, the audio output unit 503 may provide an audio output (such as call signal receiving sound or message receiving sound) related to a specific function executed by the electronic device 500. The input unit 504 may include a Graphics Processing Unit (GPU) 5041 and a microphone 5042, and the graphics processing unit 5041 processes image data of still images or videos obtained by an image capture device (for example, a camera) in a video capture mode or an image capture mode. The display unit 506 may include a display panel 5061, and the display panel 5061 may be configured in the form of a liquid crystal display, an organic light-emitting diode, or the like. In some embodiments, the user input unit 507 includes a touch panel 5071 and other input devices 5072. The touch panel 5071 is also called a touchscreen. The touch panel 5071 may include two parts: a touch detection apparatus and a touch controller. Other input devices 5072 may include, but are not limited to, a physical keyboard, a functional key (such as a volume control key or a switch key), a track ball, a mouse, and a joystick, and details are not described herein again. The memory 509 may be configured to store software programs and various pieces of data, which includes but is not limited to an application program and an operating system. In some embodiments, the processor 510 may integrate an application processor and a modem processor, where the application processor mainly processes an operating system, a user interface, an application, and the like, and the modem processor mainly processes wireless communication. It is to be understood that, the modem processor may not be integrated into the processor 510.

The beneficial effects of various implementations may refer to those of the corresponding implementations in the foregoing method embodiments, which are not detailed herein.

The embodiments of the present disclosure further provide a readable storage medium, storing a program or instructions. The program or the instructions, when executed by a processor, implement the processes of the image display method according to any of the embodiments and can achieve the same technical effects, which is not detailed herein.

The processor is the processor in the electronic device described in foregoing embodiments. The readable storage medium includes a computer-readable storage medium, such as a Read-Only Memory (ROM), a Random Access Memory (RAM), a magnetic disk, or an optical disc.

The embodiments of the present disclosure further provide a chip, including a processor and a communication interface. The communication interface is coupled to the processor. The processor is configured to run a program or instructions, to implement the processes of the image display method according to any of the foregoing embodiments, which can realize the same technical effects. The specific content is not detailed herein.

It is to be understood that the chip mentioned in the embodiments of the present disclosure may be called a system-level chip, a system chip, a chip system, or a system-on-chip.

It is to be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses. In addition, it is to be noted that the scope of the method and apparatus in the embodiments of the present disclosure is not limited to performing functions in the order shown or discussed, and may include performing functions in a substantially simultaneous manner or in a reverse order according to the functions involved. For example, the method may be performed in an order different from the described order, and various steps may be added, omitted, or combined. In addition, features described in some embodiments may be combined in other embodiments. In addition, features described in some embodiments may be combined in other embodiments.

According to the descriptions in the foregoing embodiments, a person skilled in the art may clearly learn that the method according to the foregoing embodiments may be implemented by relying on software and a commodity hardware platform or by using hardware. Based on such an understanding, the technical solutions of the present disclosure essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the method described in any of the embodiments of the present disclosure.

The embodiments of the present disclosure have been described above with reference to the accompanying drawings. The present disclosure is not limited to the specific embodiments described above, and the specific embodiments described above are merely exemplary. Those skilled in the art may make various variations under the teaching of the present disclosure without departing from the spirit of the present disclosure and the protection scope of the claims, and such variations shall all fall within the protection scope of the present disclosure.

What is claimed is:

1. An image display method, comprising:

receiving a first input from a user when an electronic device is in a target shooting mode;

shooting M frame images in response to the first input; and displaying, when a first image among the M frame images comprises a target object, a second image in a first display region, wherein the second image is an image after first processing is performed on the first image, the first processing is to remove the target object in the first image based on at least one frame image among the M frame images, the at least one frame image does not comprise the first image, and M is an integer greater than 1, wherein displaying, when the first image among the M frame images comprises the target object, the second image in the first display region comprises:

when the first image among the M frame images comprises the target object, displaying the second image in the first display region, and displaying a third image in a second display region, the second display region being different from the first display region, wherein when the target shooting mode is a target video mode, the third image comprises the first image; when the target shooting mode is a target photo mode, the third image comprises at least one of the following: the first image, a fourth image, or a fifth image, wherein the fourth image is an image after the target object in the first image is subjected to motion denoising processing, and the fifth image is an image after the target object in the first image is subjected to motion trail enhancement processing, wherein after displaying the second image in the first display region, and displaying the third image in the second display region, the method further comprises:

receiving a second input from the user; and saving a target image in response to the second input, wherein the target image comprises at least one of the following: the second image, a sixth image, or a composite image, wherein the sixth image is at least one image comprised in the third image, and the composite image is an image obtained by combining at least two images among seventh images, and the seventh images comprise the second image and all images comprised in the third image.

2. The image display method according to claim 1, wherein when the target image comprises the composite image, before receiving the second input from the user, the method further comprises:

receiving a third input from the user; and determining the at least two images from the seventh images in response to the third input, wherein the third input is an input that the user drags the at least two images to a target region, and the target region is configured to trigger the composition of the at least two images into the target image.

3. The image display method according to claim 2, wherein after determining the at least two images from the seventh images, the method further comprises:

receiving a fourth input from the user; and performing a target operation in response to the fourth input, wherein the target operation comprises at least one of the following: adjusting a position of an eighth image in the at least two images, adjusting a size of the eighth image, rotating a direction of the eighth image, deleting the eighth image, or adding text in a blank area where the eighth image is located.

4. An electronic device, comprising:

a memory storing a computer program; and a processor coupled to the memory and configured to execute the computer program to perform operations comprising:

receiving a first input from a user when the electronic device is in a target shooting mode;

shooting M frame images in response to the first input; and displaying, when a first image among the M frame images comprises a target object, a second image in a first display region, wherein the second image is an image after first processing is performed on the first image, the first processing is to remove the target object in the first image based on at least one frame image among the M frame images, the at least one frame image does not comprise the first image, and M is an integer greater than 1, wherein displaying, when the first image among the M frame images comprises the target object, the second image in the first display region comprises:

when the first image among the M frame images comprises the target object, displaying the second image in the first display region, and displaying a third image in a second display region, the second display region being different from the first display region, wherein when the target shooting mode is a target video mode, the third image comprises the first image; when the target shooting mode is a target photo mode, the third image comprises at least one of the following: the first image, a fourth image, or a fifth image, wherein the fourth image is an image after the target object in the first image is subjected to motion denoising processing, and the fifth image is an image after the target object in the first image is subjected to motion trail enhancement processing, wherein after displaying the second image in the first display region, and displaying the third image in the second display region, the operations further comprise:

receiving a second input from the user; and saving a target image in response to the second input, wherein the target image comprises at least one of the following: the second image, a sixth image, or a composite image, wherein the sixth image is at least one image comprised in the third image, and the composite image is an image obtained by combining at least two images among seventh images, and the seventh images comprise the second image and all images comprised in the third image.

5. The electronic device according to claim 4, wherein when the target image comprises the composite image, before receiving the second input from the user, the operations further comprise:

receiving a third input from the user; and determining the at least two images from the seventh images in response to the third input, wherein the third input is an input that the user drags the at least two images to a target region, and the target region is configured to trigger the composition of the at least two images into the target image.

6. The electronic device according to claim 5, wherein after determining the at least two images from the seventh images, the operations further comprise:

receiving a fourth input from the user; and performing a target operation in response to the fourth input, wherein the target operation comprises at least one of the following: adjusting a position of an eighth image in the at least two images, adjusting a size of the eighth image, rotating a direction of the eighth image, deleting the eighth image, or adding text in a blank area where the eighth image is located.

7. A non-transitory computer-readable storage medium, storing a computer program, when the computer program is executed by a processor of an electronic device, causes the processor to perform operations comprising:

receiving a first input from a user when the electronic device is in a target shooting mode;

shooting M frame images in response to the first input; and displaying, when a first image among the M frame images comprises a target object, a second image in a first display region, wherein the second image is an image after first processing is performed on the first image, the first processing is to remove the target object in the first image based on at least one frame image among the M frame images, the at least one frame image does not comprise the first image, and M is an integer greater than 1, wherein displaying, when the first image among the M frame images comprises the target object, the second image in the first display region comprises:

when the first image among the M frame images comprises the target object, displaying the second image in the first display region, and displaying a third image in a second display region, the second display region being different from the first display region, wherein when the target shooting mode is a target video mode, the third image comprises the first image; when the target shooting mode is a target photo mode, the third image comprises at least one of the following: the first image, a fourth image, or a fifth image, wherein the fourth image is an image after the target object in the first image is subjected to motion denoising processing, and the fifth image is an image after the target object in the first image is subjected to motion trail enhancement processing, wherein after displaying the second image in the first display region, and displaying the third image in the second display region, the operations further comprise:

receiving a second input from the user; and saving a target image in response to the second input, wherein the target image comprises at least one of the following: the second image, a sixth image, or a composite image, wherein the sixth image is at least one image comprised in the third image, and the composite image is an image obtained by combining at least two images among seventh images, and the seventh images comprise the second image and all images comprised in the third image.

8. The non-transitory computer-readable storage medium according to claim 7, wherein when the target image comprises the composite image, before receiving the second input from the user, the operations further comprise:

receiving a third input from the user; and determining the at least two images from the seventh images in response to the third input, wherein the third input is an input that the user drags the at least two images to a target region, and the target region is configured to trigger the composition of the at least two images into the target image.

9. The non-transitory computer-readable storage medium according to claim 8, wherein after determining the at least two images from the seventh images, the operations further comprise:

receiving a fourth input from the user; and performing a target operation in response to the fourth input, wherein the target operation comprises at least one of the following: adjusting a position of an eighth image in the at least two images, adjusting a size of the eighth image, rotating a direction of the eighth image, deleting the eighth image, or adding text in a blank area where the eighth image is located.

* * * * *